United States Patent [19]

Emmett

[11] 4,191,928

[45] Mar. 4, 1980

[54] LASER SYSTEM USING REGENERATIVE AMPLIFIER

[75] Inventor: John L. Emmett, Pleasanton, Calif.

[73] Assignee: The United States of America as represented by the United States Department of Energy, Washington, D.C.

[21] Appl. No.: 868,644

[22] Filed: Jan. 11, 1978

[51] Int. Cl.² ............................ H01S 3/05; H01S 3/23
[52] U.S. Cl. .............................. 330/4.3; 331/94.5 C; 331/94.5 T
[58] Field of Search ...................... 331/94.5 C, 94.5 Q, 331/95.5 E, 95.5 T, ; 330/4.3

[56] References Cited

U.S. PATENT DOCUMENTS

| | | | |
|---|---|---|---|
| 3,243,724 | 3/1966 | Vuylstere | 331/94.5 Q |
| 3,247,467 | 4/1966 | Geusic et al. | 331/94.5 C |
| 3,258,717 | 6/1966 | Katzman | 331/94.5 C |
| 3,597,695 | 8/1971 | Swain et al. | 330/4.3 |
| 3,646,469 | 2/1972 | Buczek et al. | 331/94.5 C |
| 3,928,811 | 12/1975 | Hughes | 330/4.3 |
| 3,928,818 | 12/1975 | White | 331/94.5 T |

Primary Examiner—Nelson Moskowitz
Attorney, Agent, or Firm—R. V. Lupo; P. Martin Simpson, Jr.; Roger S. Gaither

[57] ABSTRACT

High energy laser system using a regenerative amplifier, which relaxes all constraints on laser components other than the intrinsic damage level of matter, so as to enable use of available laser system components. This can be accomplished by use of segmented components, spatial filters, at least one amplifier using solid state or gaseous media, and separated reflector members providing a long round trip time through the regenerative cavity, thereby allowing slower switching and adequate time to clear the spatial filters, etc. The laser system simplifies component requirements and reduces component cost while providing high energy output.

32 Claims, 10 Drawing Figures

LASER SYSTEM USING REGENERATIVE AMPLIFIER

BACKGROUND OF THE INVENTION

The invention described herein was made at the Lawrence Livermore Laboratory under Contract No. W-7405-ENG-48, between the United States Department of Energy (formerly U.S. Energy Research and Development Administration) and the University of California.

The invention relates to laser systems, and more particularly to high energy laser systems which utilize regenerative amplifiers.

There exist in the prior art various types of systems using regenerative amplifiers for producing a high energy laser, the following being exemplary of these prior efforts: U.S. Pat. No. 3,243,724 to Vuylsteke which teaches a method for producing very short, high intensity laser pulses, using regenerative amplification techniques. A flashlamp produces a popular inversion, in a cavity with the end reflectivity turned off. After about 80% of the population is excited to a metastable state, the end reflectivity is turned on, the population inversion decreases, and radiant energy within the cavity builds up by both spontaneous and stimulated emission. After radiant energy density has increased to a peak, the end reflectivity is again turned off, and the radiation is quickly extracted from the cavity through a shunt path. Vuylsteke appears to contemplate only a moderately long lifetime upper state, such as present in a ruby rod, for example, and his excitation source is a flashlamp which pumps only once in a cycle.

U.S. Pat. No. 3,414,835 to Miller teaches the use of a closed path optical system to cause an injector laser pulse to be multiply reflected from two or more surfaces and to be periodically focused and refocused, so that the light beam passes through a workpiece or sample many times.

U.S. Pat. No. 3,668,536 to Michon teaches the use of a single amplifier with fully reflective means spaced from the ends of the amplifier, to reflect light back into the amplifier and cause said amplifier to respond as if it were several amplifier stages in series. Polarization switching is employed, and up to four passes can be accomplished. Pulse switchout means is also provided.

U.S. Pat. No. 3,597,695 to Swain et al., teaches the use of one or many passes of a laser pulse through a single regenerative amplifier for laser amplification. The (polarized) laser pulse is injected into the cavity containing the amplifier and two mirrors spaced therefrom, allowed to pass one or more times through the amplifier, and switched out of the cavity by polarization control using a Pockels cell. The energy output of the amplifier is limited by the weakest optical component, the Pockels cell; and Swain et al., appear to contemplate only the use of relatively long lifetime gain media, such as $Nd^{3+}$:glass, where multiple excitation of the gain medium is unnecessary.

U.S. Pat. No. 3,646,468 to Buczek et al., teaches the use of a ring interferometer, containing one or more regenerative amplifiers driven by a low power oscillator, with the amplifier gain just below the threshold for oscillation. The gain medium of this traveling wave regenerative amplifier is driven in only one direction around the ring and requires slaving the resonant frequency of the ring interferometer to the oscillator, which should have a spectrally pure output.

U.S. Pat. No. 3,968,456 to Welch teaches the use of a regenerative amplifier in conjunction with a remotely located source of light or means of reflection. Welch terminates one end of the regenerative amplifier with a semitransparent plane mirror. If a light source with the same frequency as the regenerative amplifier laser light, or a retro-reflecting member, enters into the field of view of the regenerative amplifier, the light circulating in the amplifier is sharply increased, and the presence of the remote object can be detected. Since the efficiency of generation is of no concern to Welch and since high power outputs are not anticipated, suppression of diffraction effects and maintenance of a high fill factor are not discussed in the Welch patent. No specification of the dimensions of the regenerative amplifier resonator are given, and Welch gives no consideration to the creation of an optical relay.

Present approaches to high power laser systems are long chains of amplifiers, having many repeated optical components of increasingly large size and forming modules to drive the final laser amplification stages or modules for producing a pulse of the required energy (100 terawatts, 100 kilojoules per pulse now being considered as required to produce adequate thermonuclear reactions).

The 20-beam Shiva laser system is the most powerful laser system in the world at the filling of this application. The Shiva laser system has delivered over 10 kJ in less than a nonosecond (over one terawatt) in its first firings of all 20 laser chains. The system will deliver its designed 20-30 TW in the near future. Shiva/Nova is expected to be a 40-beam laser system similar to Shiva, but with final amplification apertures of 30 cm instead of the 20 cm aperture presently used on Shiva and the two-beam Argus laser systems.

For example, the laser system known as Argus is typical of the long chain (multiple modules) amplifier laser systems, wherein one chain thereof will provide 2 TW and 0.8 to 1.5 kJ, but the last module of that chain stores 2.2 kJ and is more than capable of 2 TW, while this last module and its spatial filter represent only approximately 10% of the system cost. In another laser system which involves multiple long chain, multiple module amplifiers, known as Shiva Nova, output of a single chain is 5.7 kJ and about 5 TW. The last four 30 cm disks (2 modules) store 7.2 kJ, with these last two modules and a spatial filter comprising about 20% of the chain cost. Thus the driver chain in high power lasers consitutes a major portion of the expense of the system. In very large systems this expense may actually preclude construction of the laser. Thus a need exists in the prior art for a high power laser system which reduces the size and expense of driver chains while producing the energy required for an application such as in laser fusion power plants.

SUMMARY OF THE INVENTION

The present invention is directed to a laser system which utilizes a regenerative amplifier cavity wherein a low energy pulse is switched into the cavity and passed through the amplifier many times so as to achieve the desired energy gain, whereupon the amplified pulses are switched out of the cavity and directed to a point of use. During each pass through the cavity, the pulse passes through a spatial filter, which functions to smooth the pulse spatially or to remove therefrom the undesirable noise (phase and amplitude distortions). The length of the cavity (and thus the transit time) is such that the pinhole of the spatial filter is cleared of plasma from one pass of the pulse therethrough before the next pass arrives at the filter, preventing significant attenuation in the filter. Transverse gain stabilization is accomplished by either utilizing segmented glass amplifier disks (which reduces loss due to amplified fluorescence) or using the regenerative feature of the system to keep the gain below the parasitic limit. Switching can be accomplished, for example, by a polarizer and a Pockels cell built with alternating polarity strip transmission lines between the crystal bars, whereby the cavity can be switched at high voltages using electro-optical crystals. Alternatively, other switching means such as segmented Faraday rotators can be used. Thus, with the exception of the intrinsic damage level of matter, this laser system relaxes most constraints on laser components, so as to enable use of current technology to produce a relatively simple laser system capable of producing high energy output, without the long chain of amplifiers to drive the system, thereby substantially reducing the size and expense of a high power laser system over the conventionally used long chain amplifier systems.

Therefore, it is an object of the present invention to provide a high energy laser system.

A further object of the invention is to provide a high energy laser system using regenerative amplifiers.

Another object of the present invention is to provide a high energy laser system in which segmented optical components are utilized to reduce parasitic oscillation and amplified fluorescence loss therein.

Another object of the present invention is to provide a laser system which relaxes most constraints on system components other than the intrinsic damage level of matter.

Other objects of the present invention will become readily apparent to one skilled in the art from the following description and accompanying drawings.

DESCRIPTION OF THE INVENTION

As pointed out above, the present invention overcomes the problems of size and expense involved in present day laser systems using long chain amplifiers. The invention achieves this by the use of a regenerative amplifier cavity wherein a low energy pulse switched into the cavity is amplified by many passes through an amplification medium within the cavity to achieve the desired gain. The "round trip" path length for the pulse is long (as for example, 10-1000 meters or more) to allow for possible repetitive pumping of the amplification medium and to allow the plasma formed within the spatial filter pinhole to clear between successive passes. The apparatus provides for long transit times through long path lengths. After the desired gain has been reached, the amplified pulse is switched out of the cavity to a point of use.

Figure 1:
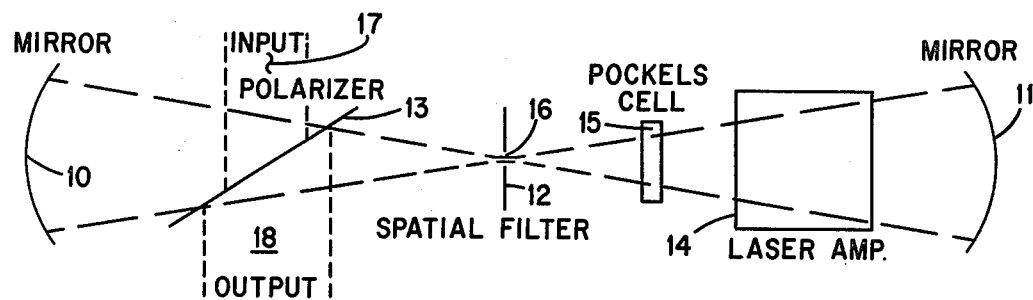
FIG. 1 schematically illustrates an embodiment of the high energy laser of this invention.

Referring now to the drawings, FIG. 1 illustrates a preferred embodiment of a large injection locked regenerative amplifier laser system which is basically composed of a pair of separated reflector members or mirrors 10 and 11, a pinhole spatial filter assembly 12 positioned centrally between mirrors 10 and 11, a polarizer assembly 13 between mirror 10 and filter assembly 12, a laser amplifier assembly 14 intermediate to mirror 11 and filter assembly 12, and a Pockels cell or switch assembly 15 positioned between amplifier assembly 14 and filter assembly 12. By way of example, mirrors 10 and 11 are positioned 5-1000 meters apart and have a diameter or cross-sectional distance of 0.2-10.0 meters or even more if useful. Also, the mirrors could be segmented to simplify fabrication. Spatial filter assembly 12 is located at the beam waist in the cavity formed by mirrors 10 and 11 and may be constructed as is known in the art with a central member having a pinhole 16. The FIG. 1 laser system, if of a short length (less than 3 meters) will operate under atmospheric conditions except for the spatial filter assembly. For the long length, large devices (3 meters to 1000 meters) it is necessary to enclose the system in a casing or housing, and evacuate it to a pressure in the 0.1-10 Torr range.

A special case of the preferred embodiment of FIG. 1 described in the paragraph above is the concentric resonator wherein the reflector members 10 and 11 form an optical relay. The optical relay concept allows a regenerative amplifier to maintain high fill factors, to suppress diffraction effects, and to minimize phase distortion. The concentric resonator case of FIG. 1 is the only fully relayed stable resonator made up of two identical mirrors. A more general treatment of the optical relay as applied to the regenerative amplifier is disclosed in Ser. No. 868,642, "A Fully Relayed Regenerative Amplifier" by Alexander J. Glass, filed on the same day as this application, assigned to the assignee of this application, and incorporated by reference herein.

While the FIG. 1 embodiment illustrates a two sided (ended) resonator arrangement, it is not intended to limit the invention to such a configuration, since three or four sided resonators will offer much greater flexibility in placement of Pockels cells, spatial filters, polarizers, and amplifiers. Also, it is understood that another laser amplifier assembly could be utilized on the opposite side of the spatial filter assembly. The spatial filter assembly is located at the beam waist, which is the region of minimum beam diameter between two focusing elements of a resonating cavity. In addition, the location of the Pockels cell and polarizer or other switching means may be on the same side of the spatial filter and located in interchanged positions. Many-sided resonator configurations with open optical paths are disclosed in Ser. No. 868,640, "Multiple Pass Laser Amplification for Fusion Applications with Near-Field or Far-Field Optical Separation" by Wilhelm F. Hagen, filed on the same day as this application, assigned to the assignee of this application, and incorporated by reference herein.

The problems associated with the laser system of FIG. 1 are outlined as follows and individually discussed hereinafter:
(1) Stabilization and Atmospheric Scintillation,
(2) Transverse Gain Stabilization,
(3) Mirror and Polarizer Damage Limits,
(4) Switchout,
(5) Spatial Filters, and
(6) Prepulse Isolation.

Some examples with Nd-Glass are presented.

STABILIZATION AND ATMOSPHERIC SCINTILLATION

While not shown, it will be necessary to servo control the mirrors 10 and 11 and possibly the spatial filter assembly 12. Such servo control means are known in the art and thus need not be described herein. The frequency response of the large optical components is very low and thus is little different than on the currently used long chain amplifier systems. As pointed out above, for short length systems, the laser can operate in the atmosphere except at the spatial filter, but for large, long length systems a vacuum enclosure must be utilized for the regenerative cavity.

TRANSVERSE GAIN STABILIZATION

Figure 3:
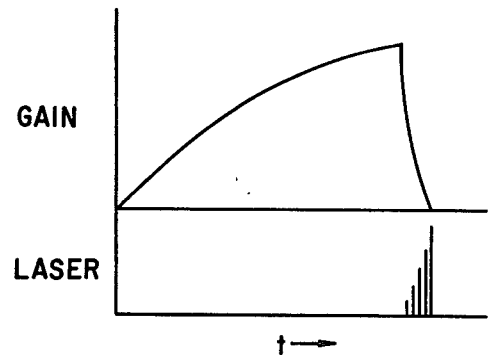
FIGS. 3 and 4 graphically illustrate two methods of transverse gain stabilization.
Figure 4:
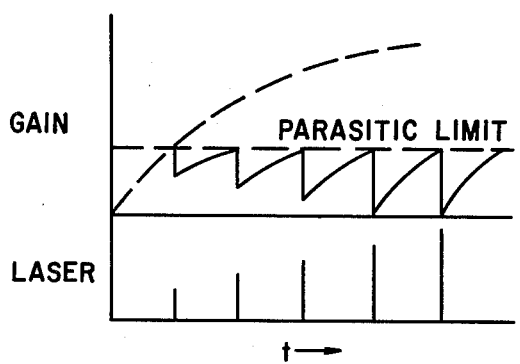

This may be readily accomplished by two methods, graphically illustrated in FIGS. 3 and 4, respectively.

The first method or approach (FIG. 3) is to break up the gain medium in transverse direction with appropriate absorbers.

Figure 2:
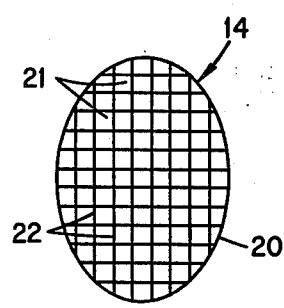
FIG. 2 illustrates an embodiment of a segmented glass amplifier disk for use in the FIG. 1 system.

For example, in a glass amplifier, one would divide the amplifier disk into small segments as illustrated in FIG. 2, such that disk 20 is composed of a plurality of segments 21 with each segment being about 15 to 30 cm, for a Nd:glass disk having an overall disk size of 2×4 meters. Other composite amplifier designs are disclosed in Ser. No. 868,641, "Staggered Amplifier Configuration for Laser Fusion Amplifier Chains", by Wilhelm F. Hagen, filed on the same day as this application, assigned to the assignee of this application, and incorporated by reference herein. Also, the disk segments could be separated along the beam axis, if desired. Between the disk segments an absorbing glass 22, such as those doped with copper oxide, or samarium is used, which also fuses the segments together. This absorbing glass can be about 1 mm thick and functions to suppress parasitic oscillation or amplified fluorescence. Such a thickness will intercept less than 1% of the beam, and thus it will be a small loss. Similar approaches could be used with gas laser amplifier systems under certain conditions. The interference pattern arising from this obstruction will diffract away or be eliminated by the spatial filter. One method and apparatus for joining composite amplifier disks is disclosed in Ser. No. 868,643 "Composite Solid State Laser Amplifier Discs" by James A. Glaze, filed on the same day as this application, assigned to the assignee of this application and incorporated by reference herein.

The second approach or method (FIG. 4) is to use the regenerative feature of the system to keep the gain below the parasitic limit naturally and is particularly suited to very long resonators (like 1 km) where the round trip transit time can be in the 1–15 μsec region. This approach also looks attractive for gas lasers with shorter pump times and shorter resonators, where repumping of the laser medium can occur.

MIRROR AND POLARIZER DAMAGE LIMITS

It is clear that from the wide variety of resonator configurations that can be designed around the basic concept of this invention, the mirrors, polarizers and amplifiers can be located at positions consistent with their damage limits or saturation fluxes.

OPTICAL SWITCHING

Figure 5:
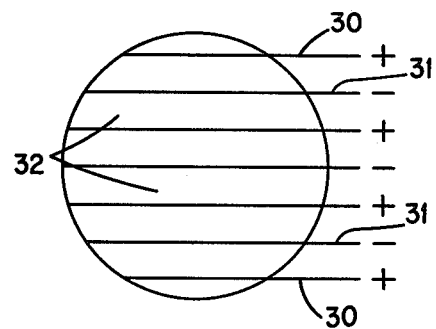
FIG. 5 schematically illustrates an embodiment of a Pockels cell for use in the FIG. 1 embodiment.

It is quite clear that there are a wide variety of ways of accomplishing this, such as rotating optics, phase shifting a mirror, evanescent wave coupling, Faraday rotators, Pockels cells, etc. Small systems can easily use pulsed rotators, however, at meter apertures one would have to switch megajoules in microseconds. For a large, long (1000 meter) length system, for example, a Pockels cell can be used which is built up as illustrated in FIG. 5, driven with alternating polarity strip transmission lines 30 and 31 positioned between crystal bars 32. For active material, crystalline quartz or ADP (ammonium di-hydrogen phosphate) may be used. Crystalline electrooptic materials like ADP are typically available in pieces up to 10 cm in diameter, so the segmented Pockels cell could be composed of such pieces in the array as shown in FIG. 5. Note that there is no need for a large linear or quadratic electro-optic coefficient since one or both switch slowly (compared to 1 ns) and use 100–200 kV with ease, and thus economical materials can be used. As an example, glasses can be made, which can be heat treated to precipitate crystals and which show linear or quadratic electro-optic effect. The crystals are allowed to reach 50–100 Å in size and thus will not scatter light. If linear materials are precipitated, they will have to be oriented (by nucleation in an electric field, stress field, etc.). With quadratic materials (para electric or ferroelectric), one only needs to orient the domains by poling the material as is done with ceramics. Such materials are described in greater detail in Applied Physics Letter, Vol. 7, No. 5, Sept. 1, 1965, "ElectroOptics Effect of Ferroelectric Microcrystals in a Glass Matrix", by N. F. Borelli et al. Thus, such materials can be made if ADP or quartz is too costly or otherwise inappropriate. Note again that the spatial filter removes the interference pattern caused by the strip transmission line obscuration.

Figure 6:
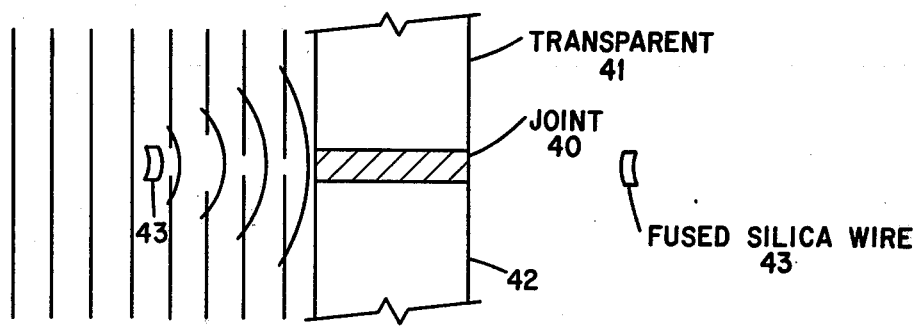
FIG. 6 illustrates an enlarged partial cross-sectional view of a Pockels cell joint protected by fused silica wire.

Since the joints of the segmented Pockels cell of FIG. 5 will require protection from the laser beam, an array of fused silica wires may be utilized as illustrated in FIG. 6 (only one set shown) wherein a joint 40 between two transparent members 41 and 42 has a pair of fused silica wires 43 positioned in spaced relation on opposite sides of joint 40. The wires 43 are shaped in cross-section like a lens and diverge the laser light to lower the flux on the joint 40. The resulting pattern will diffract away rapidly. The wires 43, for example, may have a cross-sectional width of about 1 mm and may be located about 1 cm from the joint 40.

The polarizer assembly 13 and the Pockels cell 15 function, as is known in the art, to inject a low energy signal or pulse (~1 joule) from an externally located source, such as a laser oscillator, into the regenerative cavity, as indicated at 17, wherein the input pulse 17 is amplified by multiple passes through the cavity. After the pulse has reached saturation intensity (net gain) it is deflected or switched out of the cavity as indicated at 18 to a point of use. During amplification of the input pulse in the regenerative amplifier cavity, the polarizer and Pockels cell are in an inactivated state, such that they pass the pulse through undeviated in direction, or deviated by a fixed and controlled amount, depending on the cavity component configuration. With this pulse switching arrangement, the input signal or pulse may be $10^{-8}$ to $10^{-11}$ of the output pulse or stated differently, the gain of the repetitive amplification is $10^8$–$10^{11}$. Accordingly, it is readily seen that the cavity may be switched at high voltages by electro-optical crystals with low electro-optic coefficients. Also, due to the length of the resonant cavity, there is a time span of up to 1 $\mu$sec for switching time of the Pockels cell thus further reducing switch problems.

The input signal can be injected as indicated by reflection off the polarizer, or by any other means known in the art, capable of providing a suitable insertion of optical energy in the cavity.

Other means of switching, such as Faraday rotators, can also be adapted to large aperture, segmented systems.

SPATIAL FILTERS

Figure 7:
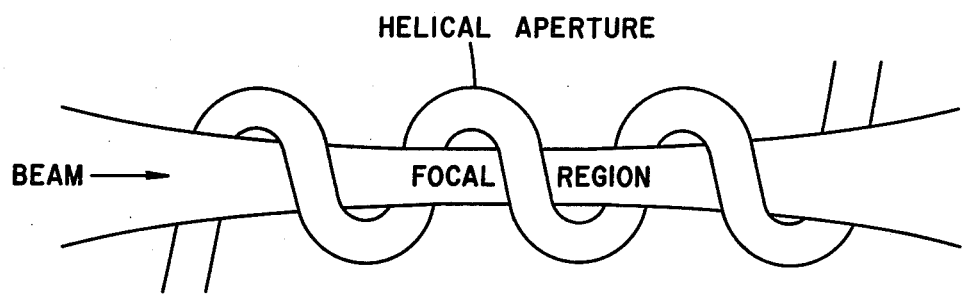
FIGS. 7 and 8 illustrate embodiments of spatial filters made according to the invention.
Figure 8:
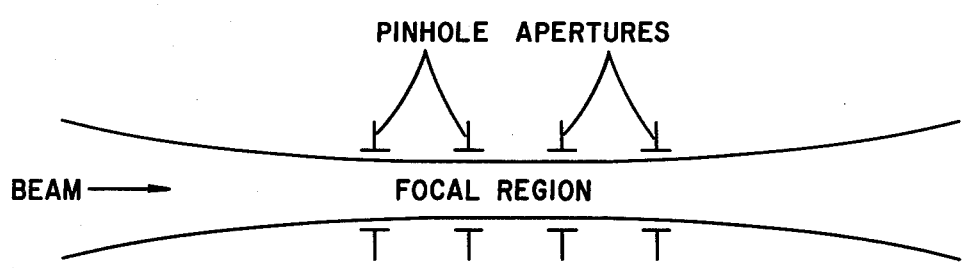

The real interest in a long resonator comes from the need to have the plasma formed at the spatial filter completely clear of the aperture before the next pulse. For systems operating at f/100 to f/1000, the pinhole size runs from 0.1 to 3.0 cm. In addition, the depth of field of the focus is quite long, so we can distribute the spatial filter in such a way that it can be both long in the Z direction, as well as segmented in the $\theta$ direction if necessary. A helix as illustrated in FIG. 7 may be desired as it could be continuously fed into the filter if shot to shot erosion is excessive. Also, the spatial filter may be composed of a multiple series of pinholes as illustrated in FIG. 8.

PREPULSE ISOLATION

It has been determined that with a long cavity transit time of a km length cavity, a rotating wheel at an external focus is fast enough to give complete prepulse isolation. Also, saturable absorbers can suppress any prepulse emitted by the input signal oscillator or any parasitic pulse issuing from the amplifier.

SOME EXAMPLES WITH Nd:GLASS

Consider a Nd:glass amplifier system with a 1 meter beam diameter. Assuming use of two disks 100 cm×200 cm×10 cm with an index nonlinearity $n_2 \approx 0.7 \times 10^{-13}$ esu on each side of the spatial filter (4 disks total), by either method of transverse gain control, we can achieve a stored energy density of 0.5 J/cm$^3$, and thus have stored 315 kJ. Since the resonator is long (1 km), the terminal level completely relaxes to the ground state between passes, so almost all of the stored energy is extracted, about 250 kJ. If one limits the nonlinear phase distortion to a value of 2.5 radians between filters, one has approximately 150 TW (TW=terawatts) output power. For a fill factor (the ratio of illuminated area to total aperture area) of 0.6, we have 150 kJ and 90 TW, which is roughly half the output of the above referenced large, multiple chain amplifier laser system (Shiva/Nova). Shiva/Nova has an output of 5.7 kJ and about 5 TW in each chain. Note also that only 30 MJ or less is required to pump the system.

Another example is to use the two 30 cm disk output amplifiers (such as proposed for Shiva/Nova) on either side of the spatial filter, as shown in FIG. 1. Again, assuming an $n_2$ of $0.7 \times 10^{-13}$ esu and a gain coefficient 0.045 cm$^{-1}$, one has 7.2 kJ stored energy. Of this, one can extract 5 kJ at a peak power of 10.5 TW. The required pump energy is 900 kJ, so that 50 of these will provide 250 kJ and over 500 TW, with a 45 MJ pump. Another choice would be to use 6 Nd:glass amplifier disks which would yield 7.5 kJ and 7.5 TW. With 50 devices in parallel, the output would be 375 kJ and 375 TW, with a pump requirement of 70 MJ. In each case presented, the overall efficiency is 0.5%, much more efficient than present chain designs.

It has been shown that a mode matched pulse of as little as $10^{-11}$ of the output is sufficient to lock the regenerative amplifier. Thus the system described herein should operate with a 1 $\mu$(mJ) drive pulse. By providing at the most a one joule drive pulse, stability of operation could be ensured.

While the above description has been primarily directed to Nd:glass amplifiers, other amplifiers may use a lasing medium of a vapor or a gas which when excited by means such as electron beam systems produces XeBr*, XeF*, KrF*, KrCl*, Xe$_2$*, Kr$_2$*, or Ar$_2$*, with a total gas pressure of typically ~1 atmosphere. This gain medium would be repetitively and synchronously pumped by an electron beam or flashlamp to provide temporary energy storage of narrowband, short wavelength fluorescence energy which is quickly extracted by the laser pulses passing therethrough. The energy storage time need only be of the order of $\tau_r$~30 nanoseconds if the gain medium is pumped immediately before the laser pulse passes therethrough. The gain per single pass through the gain medium may be of the order of 20 db; after a small number of passes (~2–10) through the medium, the laser pulse reaches saturation. After this, the circulating laser pulse efficiently extracts optical energy from the amplifier during each pass and thus grows in amplitude. Associated gain medium efficiency is of the order of 4–10%.

For more information on multiple excitation, see Ser. No. 868,639, Multiple Excitation Regenerative Amplifier Inertial Confinement System, by E. Victor George et al., filed on the same day as this application, assigned to the same assignee as this application, and incorporated by reference herein.

Figure 9:
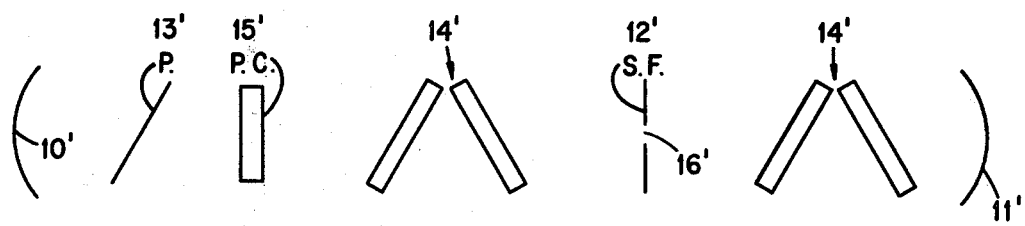
FIG. 9 schematically illustrates an embodiment of the invention utilizing two amplifier assemblies within the resonator cavity.

Referring now to the FIG. 9 embodiment of the regenerative amplifier laser system, which is generally similar to the FIG. 1 embodiment except for the positioning of the polarizer and the Pockels cell and the addition of a second laser amplifier assembly, each amplifier assembly is composed of a pair of tilted disks, positioned on the opposite side of the spatial filter assembly. Accordingly, like components are given similar reference numerals corresponding to the FIG. 1 embodiment.

EXAMPLES

Figure 10:
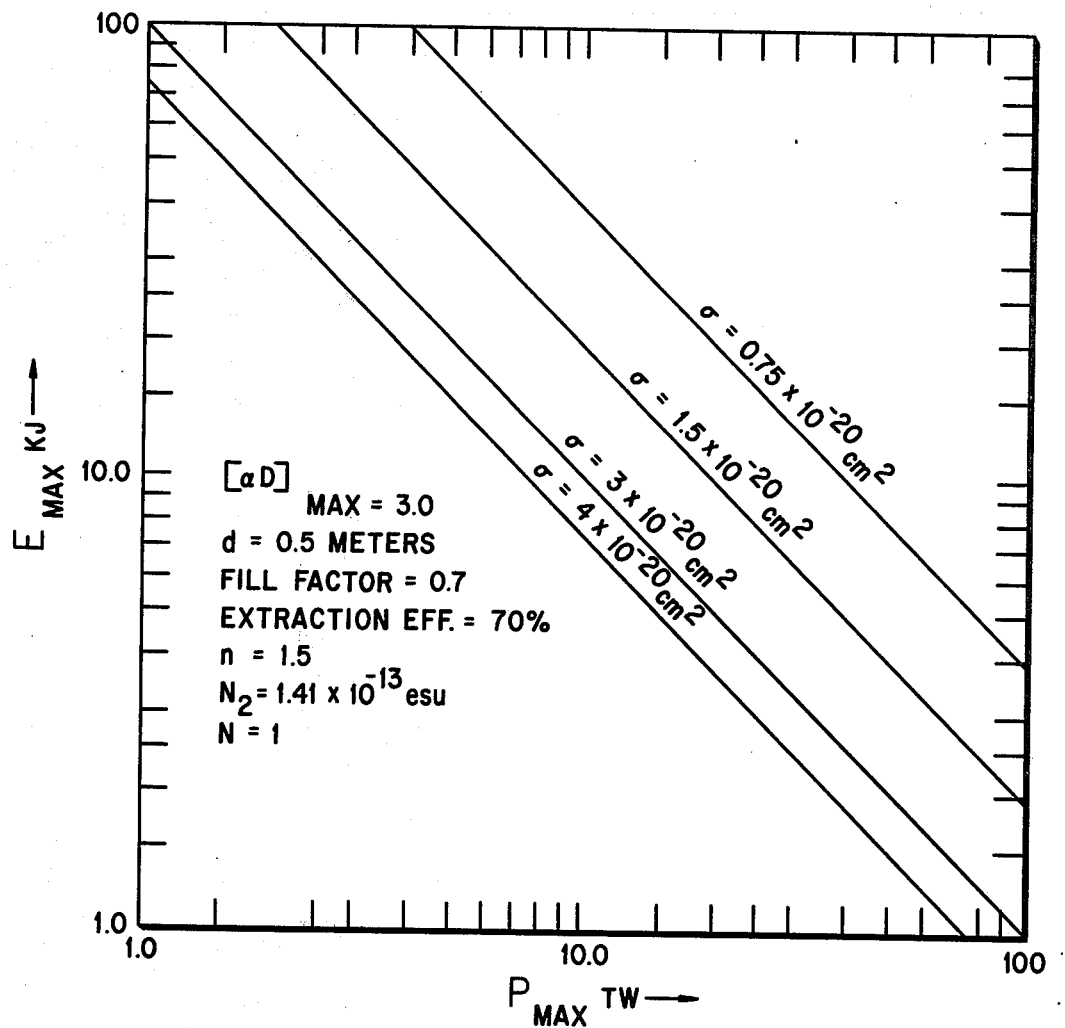
FIG. 10 graphically plots performance limits as a function of the stimulated emission cross-section.

To provide an upper bound to performance of large regenerative amplifier laser systems using Nd:glass, the following calculations and values are set forth:

The maximum energy storage density $E_d$ one can achieve in a large disk is $$E_d = \frac{N[\alpha D]_{max} hc}{2\sigma \lambda d}$$

where
  h=Planck's constant
  c=velocity of light
  $\lambda$=wavelength

α=linear gain cross-section
σ=stimulated emission cross-section
D=disk diameter
d=beam diameter
αD=gain across disk along "diameter" (major axis)
The factor 2 is an approximation for $$[(1 + n^2)^{\frac{1}{2}} + \frac{t}{n}],$$

where n is the index of refraction and t the thickness of an individual disk. N is a factor for a segmented disk which is the ratio of the long axis of the full disk to the maximum dimension of a small segment. Thus, the maximum available output energy is $$E_{max} = \frac{\pi N[\alpha D]_{max} \text{hcd} a f_{ext} L (1 + n^2)^{\frac{1}{2}}}{8\sigma\lambda}$$

where
  a is the fill factor ($\leq 1$)
  $f_{ext}$ is the fraction of the stored energy extracted
  L is the total thickness of disks, i.e., $\Sigma t$ To calculate the maximum power capability, it is assumed that half of the laser glass is on each side of the spatial filter, as illustrated in FIG. 10. The upper limit for $I_p$ is set by the B integral as follows:
Thus $$B = \frac{2\pi}{\lambda} \int_0^{L/2} \frac{I_p}{n} \gamma_L dx + \frac{2\pi}{\lambda} \int_{p.c.} I_p \gamma_{p.c.} dx = 2.5$$

Assuming that we will have a B=2 in the laser glass, take $$I_p \approx \frac{4\lambda n^2}{2\pi\gamma_L L(1 + n^2)^{\frac{1}{2}}}$$

and B=0.5 for the Pockels cell.
The maximum power than can be achieved is $$P_{max} = \frac{n^2 \lambda d^2 a}{2\gamma_L L(1 + n^2)^{\frac{1}{2}}} \text{ or } L = \frac{\lambda n^2 d^2 a}{2\gamma_L P_{max}(1 + n^2)^{\frac{1}{2}}}$$

Thus we can write $$E_{max}P_{max} \approx \frac{\pi N[\alpha D]_{max} d^3 a^2 n^2 f_{ext} \text{hc}}{16\sigma\gamma_L}$$

If one uses the following values:
a=0.7
$f_{ext}$=0.7
n~1.5
$[\alpha D]_{max}$=3.0
and makes these normalizations $$\sigma' = \frac{\sigma}{10^{-24} m^2}$$

$$n_2' = \frac{n^2}{10^{-13}}$$

one obtains $$E_{max}P_{max} \approx 3.4 \times 10^{18} \frac{Nd^3}{\sigma' n_2'}$$

where d is in meters.

The following are four examples of parameters for laser systems, embodied in this invention, based in part upon the values and calculations set forth above:

TABLE 1

|  | EXAMPLES | | | |
|---|---|---|---|---|
|  | A | B | C | D |
| No. of Beams | 1 | 1 | 6 | 10 |
| $E_{max}$(kJ) | 4 | 14 | 1,000 | 10,000 |
| $P_{max}$(TW) | 6 | 14 | 300 | 1,000 |
| Beam Diameter (meters) | 0.3 | 0.5 | 1.2 | 2.5 |
| N = | 1 | 1 | 2 | 4 |
| L (meters) | .16 | 0.2 | 0.33 | 0.75 |
| σ(cm²) | $2.7 \times 10^{-20}$ | $1.5 \times 10^{-20}$ | $1 \times 10^{-20}$ | $1.4 \times 10^{-20}$ |
| n₂(esu) | $1.4 \times 10^{-13}$ | $1.4 \times 10^{-13}$ | $1.3 \times 10^{-13}$ | $1.4 \times 10^{-13}$ |
| Gain (single pass) | 2.1 | 1.84 | 2.28 | 6.5 |
| Max flux density (surface) (J/cm²) | 4.5 | 5.7 | 11.9 | 16.1 |
| Max flux density (bulk) (J/cm²) | 5.39 | 6.8 | 14.3 | 19.4 |
| Characteristic Pulse Duration (ns) | 0.7 | 1 | 3 | 10 |

Further details of the four examples of this invention presented in Table 1 are:

EXAMPLE A

A single regenerative amplifier is envisioned, with an output beam diameter of 0.3 m. An unsegmented disk amplifier with a single pass gain of 2.1 is used to amplify a 0.7 ns seed pulse. It is assumed that the four amplifier disks are made of Owens-Illinois ED-2 laser glass. Up to 4 kJ and 6 TW can be extracted from this device.

EXAMPLE B

A device similar to Example A is envisioned, but with an aperture diameter of 0.5 m. An unsegmented amplifier uses an amplifying medium of a glass with the non-linear index coefficient of ED-2, but with a lower stimulated emission cross-section. In 1 ns, up to 14 kJ and 14 TW can be extracted.

EXAMPLE C

A device consisting of six regenerative amplifiers of 1.2 m diameter is envisioned. The amplifiers employ disks composed of two segments, using a glass with the nonlinear index of ED-2, but a cross-section for stimulated emission of less than half the value for ED-2. In a 3 ns pulse, up to 1 MJ and 300 TW can be extracted.

EXAMPLE D

A device with 10 regenerative amplifiers, each employing disks made up of four segments with a final aperture of 2.5 m is envisioned. With the cross-section of stimulated emission about half that of ED-2, and the index nonlinearity the same as ED-2, an output of up to 10 MJ and 1000 TW can be achieved.

Further development of glasses with a low cross-section for stimulated emission and low index nonlinearity, will allow even further improvements in the performance of regenerative amplifier devices, shown in FIG. 10, where the parameters, other than $\sigma$, are those of Example B above.

It has thus been shown that the present invention provides a simple high energy laser system using large regenerative amplifier arrangements, while reducing the cost over the currently known chain amplifier laser systems by 10-15%. The laser system may be used for various high energy applications, of which just a few are plasma confinement and heating systems, production of charged particles, production of neutrons, laser fusion systems, communication systems, fabrication systems, and the like.

Related copending applications which are filed on the same day as this application, assigned to the assignee of the application, and are incorporated by reference herein, are as follows:

Ser. No. 868,633, Tunable, Rare Earth-Doped Solid State Lasers, by John L. Emmett et al., wherein an excimer pump laser with a rare earth-doped solid matrix utilizes a $5d$–$4f$ radiative transition in a rare earth ion to produce visible and ultra-violet laser radiation with a possible high overall efficiency and a relatively long radiative lifetime.

Ser. No. 868,638, Repetitively Pumped Electron Beam Device, by Leland G. Schlitt, wherein fast, repetitive, electron beam pulses are produced by phased energy storage in a finite length transmission line.

While particular embodiments and examples of the invention have been illustrated and described, other possible examples and embodiments as well as modifications and changes will be apparent to those skilled in the art, and the inventor's intention is to cover in the appended claims all such examples, embodiments, modifications, and changes as come within the spirit and scope of the invention.

What I claim is:

1. An injection laser system utilizing a regenerative amplifier comprising: at least two separated reflector members having a cross-sectional distance of 0.2 to 10.0 meters and defining a resonator cavity having a beam waist therein; at least one spatial filter assembly means for removing phase and amplitude distortion from a high energy laser beam positioned in said cavity at substantially the beam waist of said resonator cavity; at least one amplifier means positioned intermediate a reflector member and at least one said spatial filter assembly; means for injecting at least one laser pulse into said cavity for amplification thereof by multiple passes through said cavity until maximum surface flux density is in excess of 4.5 joules/cm$^2$; and means for extracting the amplified laser pulse from the cavity.

2. The laser system defined in claim 1, wherein said amplifier means utilizes a solid state amplification medium.

3. The laser system defined in claim 1, wherein said amplifier means includes at least one segmented glass disk having a rare earth dopant.

4. The laser system defined in claim 3, wherein said rare earth dopant is $Nd^{3+}$.

5. The laser system defined in claim 1, wherein said reflector members are spaced 5-1000 meters apart and have a cross-sectional distance of 0.2 to 10.0 meters, and wherein said spatial filter assembly includes a pinhole forming member having a pinhole diameter of 0.01 to 20 cm.

6. The laser system defined in claim 5, wherein said pinhole diameter is 0.1 to 3.0 cm.

7. The laser system defined in claim 1, wherein said spatial filter assembly includes a pinhole forming member having a pinhole diameter of 0.1 to 3 cm.

8. The laser system defined in claim 1, wherein either of said pulse injecting means and said pulse extraction means includes a polarizer and a Pcokels cell positioned within said resonator cavity.

9. The laser system defined in claim 8, wherein said Pockels cell includes a plurality of alternating polarity strip transmission lines positioned between pairs of crystal bars.

10. The laser system defined in claim 9, wherein said Pockels cell additionally includes an array of fused silica wires positioned in spaced relation with respect to joints of said crystal bars.

11. The laser system defined in claim 1, wherein said amplifier means includes a pair of amplifier assemblies positioned on opposite sides of at least one of said spatial filter assemblies.

12. The laser system of claim 1, wherein said amplifier means utilizes a gas amplification medium.

13. The laser system of claim 12, wherein said gas amplification medium is a repetitively pumped gaseous lasing medium.

14. The laser system defined in claim 1, wherein said spatial filter assembly includes a helical member.

15. The laser system defined in claim 1, wherein said spatial filter includes a multiple series of pinholes.

16. A method for producing a high energy laser beam using an injected laser pulse to be amplified thereafter, the method comprising the steps of providing a regenerative amplifier cavity of a maximum cross-sectional distance of 0.2 to 10.0 meters; providing within said cavity at least one spatial filter for removing phase and amplitude distortions from the high energy laser beam; injecting a laser pulse to be amplified into the regenerative amplifier cavity; amplifying said injected laser pulse by passing the pulse through at least one amplifier means and through at least one of said spatial filters a multiplicity of times until maximum surface flux density is in excess of 4.5 joules/cm$^2$; and extracting the amplified laser pulse from the cavity.

17. The method defined in claim 16, additionally including the step of providing the amplifier means with a medium composed of segmented solid state material.

18. The method defined in claim 16, additionally including the steps of providing a means for injecting the energy pulse into the cavity and providing a means for extracting the amplified laser pulse from the cavity wherein either of said injectors or extracting means includes a Pockels cell formed of a plurality of crystal bars having alternating polarity strip transmission lines between the crystal bars.

19. The method defined in claim 18, additionally including the step of positioning at least one shaped fused silica wire in spaced relation with respect to each joint of the Pockels cell.

20. The method defined in claim 16, additionally including the step of forming the amplifier means from a plurality of segmented Nd:glass disks.

21. The method defined in claim 20, wherein the step of forming the amplifier means also includes the step of positioning a layer of absorbing glass between adjoining segments of the disks.

22. The method defined in claim 16, wherein the step of amplifying the injected laser pulse is carried out by passing the pulse through a gaseous lasting medium within the amplifier means.

23. The method defined in claim 22, additionally including the step of repetitively pumping the gaseous lasing medium.

24. The laser system defined in claim 1, wherein at least one of said reflector members is comprised of a plurality of reflecting means, positioned together to form a single segmented reflector unit.

25. The laser system defined in claim 1, wherein the pulse injecting means consists of a plurality of switch means positioned together to form a single segmented switch for switching the laser pulse into the cavity.

26. The laser system defined in claim 1, wherein the pulse extracting means is comprised of a plurality of switch means positioned together to form a single segmented switch for switching the laser pulse out of the cavity.

27. The method defined in claim 16 wherein the amplifying step further includes the step of reflecting the laser pulse with at least one segmented reflector.

28. The method defined in claim 16, wherein the injecting step further includes the step of providing at least one segmented switch for injecting the laser pulse.

29. The method defined in claim 16, wherein the extracting step further includes the step of providing at least one segmented switch for extracting the laser pulse.

30. The method defined in claim 17, wherein the segmented solid state material is segmented transversely to the propagation of the laser beam.

31. The method defined in claim 20, wherein the segmented Nd:glass disks are segmented transversely to the propagation of the laser beam.

32. An injection laser system utilizing a regenerative amplifier comprising: at least two separated reflector members having a cross-sectional distance of 0.2 to 10.0 meters and defining a resonator cavity having a beam waist therein; at least one spatial filter assembly means for removing phase and amplitude distortion from the beam, the spatial filter assembly means being positioned in said cavity at substantially the beam waist of said resonator cavity; at least one transversely segmented amplifier means wherein segmentations transverse to propagation of the laser beam extend in two different directions and wherein the amplifier means is positioned intermediate one of said reflector members and at least one of said spatial filter assembly means; means for injecting at least one laser pulse into said cavity for amplification thereof by multiple passes through said cavity until maximum surface flux density is in excess of 4.5 joules/cm$^2$; and means for extracting the amplified laser pulse from the cavity.

* * * * *